(12) United States Patent
Hufnagl-Abraham

(10) Patent No.: US 12,711,836 B2
(45) Date of Patent: Aug. 18, 2026

(54) LINKED GAMING MACHINES IMPLEMENTING VARIOUS GAME MODES

(71) Applicant: IGT, Las Vegas, NV (US)

(72) Inventor: Klaus Hufnagl-Abraham, Graz (AT)

(73) Assignee: IGT, Las Vegas, NV (US)

( * ) Notice: Subject to any disclaimer, the term of this patent is extended or adjusted under 35 U.S.C. 154(b) by 276 days.

(21) Appl. No.: 18/416,714

(22) Filed: Jan. 18, 2024

(65) Prior Publication Data

US 2025/0239139 A1 Jul. 24, 2025

(51) Int. Cl.
*G07F 17/32* (2006.01)
*G06F 7/58* (2006.01)

(52) U.S. Cl.
CPC .......... *G07F 17/3267* (2013.01); *G06F 7/588* (2013.01); *G07F 17/3213* (2013.01); *G07F 17/3225* (2013.01); *G07F 17/3269* (2013.01)

(58) Field of Classification Search
CPC .. G07F 17/3267; G07F 7/588; G07F 17/3213; G07F 17/3225; G07F 17/3269; G07F 17/3244
See application file for complete search history.

(56) References Cited

U.S. PATENT DOCUMENTS

| | | | |
|---|---|---|---|
| 8,147,334 B2 | 4/2012 | Gatto et al. | |
| 8,764,566 B2 | 7/2014 | Miltenberger et al. | |
| 8,932,130 B2 * | 1/2015 | Tarantino | G07F 17/3286 463/16 |
| 9,275,510 B2 | 3/2016 | Anderson et al. | |
| 11,651,654 B2 | 5/2023 | Boese | |
| 2013/0040728 A1 * | 2/2013 | Tarantino | G07F 17/3241 463/22 |
| 2023/0098012 A1 | 3/2023 | Decasa, Jr. et al. | |
| 2025/0239136 A1 * | 7/2025 | Hufnagl-Abraham | G07F 17/3213 |

* cited by examiner

*Primary Examiner* — Ronald Laneau
(74) *Attorney, Agent, or Firm* — Sheridan Ross P.C.

(57) ABSTRACT

The present disclosure relates generally to computational devices and, in particular, to a computational device, system, and method of operating a computational device. The method may include implementing various game modes during game play on at least one gaming machine in a bank of linked gaming devices.

20 Claims, 9 Drawing Sheets

500a
502
Player Information
504
Wager Credit
506
Bonus Information
508
Wager/Award History
Player Profile Database
250a 500b
512
Bank ID
514
Gaming Device ID_1
514
Gaming Device ID_2
514
Gaming Device ID_n
516
Timestamp Start
518
Timestamp Stop
520
Mode
Linked Games Database
250b

LINKED GAMING MACHINES IMPLEMENTING VARIOUS GAME MODES

BACKGROUND

Operators continually improve the functionality and game play features of gaming machines to enhance overall player/user experience. Any type of game play feature that presents the player/user with an additional opportunity to win and/or discount is often viewed as desirable and can lead to increased play of the gaming machine.

BRIEF SUMMARY

In certain embodiments, the present disclosure relates to a method of operating a computational device, including: initiating, with a processor in a first game mode, a first reel spin in which a random number generator output is used to determine a position of symbols within an array of symbol areas; after the first reel spin, evaluating, with the processor, the position of symbols within the array of symbol areas to determine, from a first paytable associated with a first expected return to player, whether the first reel spin results in a predetermined outcome warranting an update to a credit meter; updating the credit meter based on the first reel spin results and first paytable; after the first reel spin, further evaluating, with the processor, whether the random number generator output triggered occurrence of a second game mode different from the first game mode; determining, with the processor, that the random number generator output triggered occurrence of the second game mode; in response to the determining that the random number generator output triggered occurrence of the second game mode, initiating the second game mode applying a second paytable associated with a second expected return to player higher than the first expected return to player; initiating, with the processor in the second game mode, a second reel spin in which the random number generator output is used to determine a second position of symbols within the array of symbol areas; after the second reel spin, evaluating, with the processor, the second position of symbols within the array of symbol areas to determine, from the second paytable, that the second reel spin results in a predetermined outcome warranting an update to the credit meter; updating the credit meter based on the second reel spin results and second paytable; determining, from a timer output, that a predetermined time interval has expired since the initiation of the second game mode; and in response to the determining that the predetermined time interval has expired, terminating the second game mode and returning the processor to the first game mode.

In some embodiments, the present disclosure also relates to a computational device including: a user interface comprising a user input and a user output; a processor coupled with the user interface. The computational device is further disclosed to include a computer-readable storage medium, coupled with the processor, comprising instructions that are executable by the processor, wherein the instructions comprise: instructions that: initiate, in a first game mode, a first reel spin in which a random number generator output is used to determine a position of symbols within an array of symbol areas; after the first reel spin, evaluate the position of symbols within the array of symbol areas to determine, whether the first reel spin results in a predetermined outcome warranting an update to a credit meter; update the credit meter based on the first reel spin results based on a first expected return to player; after the first reel spin, further evaluate whether the random number generator output triggered occurrence of a second game mode different from the first game mode; determine that the random number generator output triggered occurrence of the second game mode; in response to the determining that the random number generator output triggered occurrence of the second game mode, initiate the second game mode based on a second return to player, the second expected return to player being higher than the first expected return to player; initiate, in the second game mode, a second reel spin in which the random number generator output is used to determine a second position of symbols within the array of symbol areas; after the second reel spin, evaluate the second position of symbols within the array of symbol areas to determine, that the second reel spin results in a predetermined outcome warranting an update to the credit meter; update the credit meter based on the second reel spin results and second expected return to player; determine, from a timer output, that a predetermined time interval has expired since the initiation of the second game mode; and in response to the determining that the predetermined time interval has expired, terminate the second game mode and return to the first game mode.

In some embodiments, the present disclosure also relates to a system that includes: a processor; a timer; a credit meter; a user interface comprising a user input and a user output; a network interface; a random number generator; and a computer-readable storage medium, coupled with the processor, comprising instructions that are executable by the processor, wherein the instructions comprise: instructions that initiate, in a first game mode, a first reel spin in which a random number generator output is used to determine a position of symbols within an array of symbol areas; after the first reel spin, evaluate the position of symbols within the array of symbol areas to determine, whether the first reel spin results in a predetermined outcome warranting an update to a credit meter; update the credit meter based on the first reel spin results based on a first expected return to player; after the first reel spin, further evaluate whether the random number generator output triggered occurrence of a second game mode different from the first game mode; determine that the random number generator output triggered occurrence of the second game mode; in response to the determining that the random number generator output triggered occurrence of the second game mode, initiate the second game mode based on a second return to player, the second expected return to player being higher than the first expected return to player; initiate, in the second game mode, a second reel spin in which the random number generator output is used to determine a second position of symbols within the array of symbol areas; after the second reel spin, evaluate the second position of symbols within the array of symbol areas to determine, that the second reel spin results in a predetermined outcome warranting an update to the credit meter; update the credit meter based on the second reel spin results and second expected return to player; determine, from a timer output, that a predetermined time interval has expired since the initiation of the second game mode; and in response to the determining that the predetermined time interval has expired, terminate the second game mode and return to the first game mode.

In certain embodiments, the present disclosure relates to a method of operating a computational device, including: initiating, with a first processor in a first game mode in a first gaming machine, a first reel spin in which a first random number generator output is used to determine a first position of symbols within an array of symbol areas; after the first reel spin, evaluating, with the first processor, the first position of symbols within the array of symbol areas to determine whether the first reel spin results in a predetermined outcome warranting an update to a first credit meter; updating the first credit meter based on the first reel spin results; after the first reel spin, further evaluating, with the first processor, whether the first random number generator output triggered occurrence of a second game mode different from the first game mode; determining, with the first processor, that the first random number generator output triggered occurrence of the second game mode; in response to the determining that the random number generator output triggered occurrence of the second game mode, automatically initiating, by a second processor of a second gaming machine, the second game mode on the second gaming machine; initiating, by the second processor in the second game mode, a reel spin in which second random number generator output of a different second random number generator is used to determine a position of symbols within an array of symbol areas; after the reel spin by the second processor, evaluating, by the second processor, the position of symbols within the array of symbol areas to determine that the reel spin results in a predetermined outcome warranting an update to a second credit meter of the second gaming machine; updating the second credit meter based on the reel spin results, wherein the update to the second credit meter is independent of updates to the credit meter of the first EGM; and terminating the second game mode and returning the second gaming machine to the first game mode.

In some embodiments, the present disclosure also relates to a computational device including: a user interface comprising a user input and a user output; a processor coupled with the user interface. The computational device is further disclosed to include a computer-readable storage medium, coupled with the processor, comprising instructions that are executable by the processor, wherein the instructions comprise: instructions that: initiate, in a first game mode, a first reel spin in which a first random number generator output is used to determine a first position of symbols within an array of symbol areas; after the first reel spin, evaluate the first position of symbols within the array of symbol areas to determine whether the first reel spin results in a predetermined outcome warranting an update to a first credit meter; update the first credit meter based on the first reel spin results; after the first reel spin, further evaluate whether the first random number generator output triggered occurrence of a second game mode different from the first game mode; determine that the first random number generator output triggered occurrence of the second game mode; in response to the determining that the random number generator output triggered occurrence of the second game mode, automatically initiating, by the first processor at a predetermined start time, the second game mode on the computational device; and sending a message to a second processor of a second computational device to automatically initiate, by the second processor at the predetermined start time, the second game mode on the second computational device.

In some embodiments, the present disclosure also relates to a system that includes: a processor; a timer; a credit meter; a user interface comprising a user input and a user output; a network interface; a random number generator; and a computer-readable storage medium, coupled with the processor, comprising instructions that are executable by the processor, wherein the instructions comprise: instructions that initiate, in a first game mode in a first gaming machine, a first reel spin in which a first random number generator output is used to determine a first position of symbols within an array of symbol areas; after the first reel spin, evaluate the first position of symbols within the array of symbol areas to determine whether the first reel spin results in a predetermined outcome warranting an update to a first credit meter; update the first credit meter based on the first reel spin results; after the first reel spin, further evaluate whether the first random number generator output triggered occurrence of a second game mode different from the first game mode; determine that the first random number generator output triggered occurrence of the second game mode; in response to the determining that the random number generator output triggered occurrence of the second game mode, causing a second processor of a second gaming machine to automatically terminate the first game mode and initiate the second game mode on the second gaming machine, wherein the first game mode is associated with a first expected return to player and the second game is associated with a second expected return to player, the second expected return to player being greater than the first expected return to player.

An Electronic Gaming Table or Electronic Table Game (EGT) as used herein refers to a gaming device in the form of a table that enables a player to play a game (including but not limited to a game of chance, a game of skill, and/or a game of partial skill), such as roulette, poker, blackjack or Baccarat, to potentially win one or more awards. There can be multiple player seats in the electronic gaming table for tournament or side game play, and each player can operate or play the game in the electronic gaming table.

A Video Gaming Machine (VGM) is a type of EGM that extensively uses multimedia rather than mechanical modalities for the gaming experience. For example, a video slot machine does not use mechanical reels, and instead uses graphical reels on a computerized display. As there are no mechanical constraints on the design of video slot machines, games often use at least five reels, and may also use non-standard layouts.

A Virtual Reality ("VR") gaming machine as used herein refers to a gaming device that enables virtual reality gaming, or the application of a three-dimensional (3-D) artificial environment to a computer game. Virtual reality environments are created with VR software and presented to the user in such a way that VR environment supersedes the real-world environment, helping the user experience the VR environment as real. A VR game might involve a 3-D image that can be explored interactively on a computing device by manipulating keys, a mouse or touchscreen. More sophisticated and immersive examples include VR headsets, wraparound display screens and VR rooms augmented with wearable computers and sensory components, such as scents and haptics devices for tactile feedback.

An Augmented Reality ("AR") gaming machine as used herein refers to a gaming device that provides an interactive gaming experience of a real-world environment where the objects that reside in the real world are enhanced by computer-generated perceptual information, sometimes across multiple sensory modalities, including visual, auditory, haptic, somatosensory, and olfactory modalities. AR can be defined as a system that fulfills three basic features: namely a combination of real and virtual worlds, real-time interaction, and accurate 3D registration of virtual and real objects. The overlaid sensory information can be constructive (i.e. additive to the natural environment), or destructive (i.e. masking of the natural environment). This experience is seamlessly interwoven with the physical world such that it is perceived as an immersive aspect of the real environment. In this way, augmented reality alters one's ongoing perception of a real-world environment, whereas virtual reality completely replaces the user's real-world environment with a simulated one. Augmented reality is related to two largely synonymous terms: mixed reality and computer-mediated reality.

A "gaming system" as used herein refers to various configurations of: (a) one or more central servers, central controllers, or remote hosts; (b) one or more gaming devices such as those located on a casino floor; and/or (c) one or more personal gaming devices, such as desktop computers, laptop computers, tablet computers or computing devices, personal digital assistants, mobile phones, and other mobile computing devices. A gaming device, gaming machine, and computational device may be used interchangeably herein.

Additional features and advantages are described herein and will be apparent from the following Description and the figures.

DETAILED DESCRIPTION

Figure 1A:
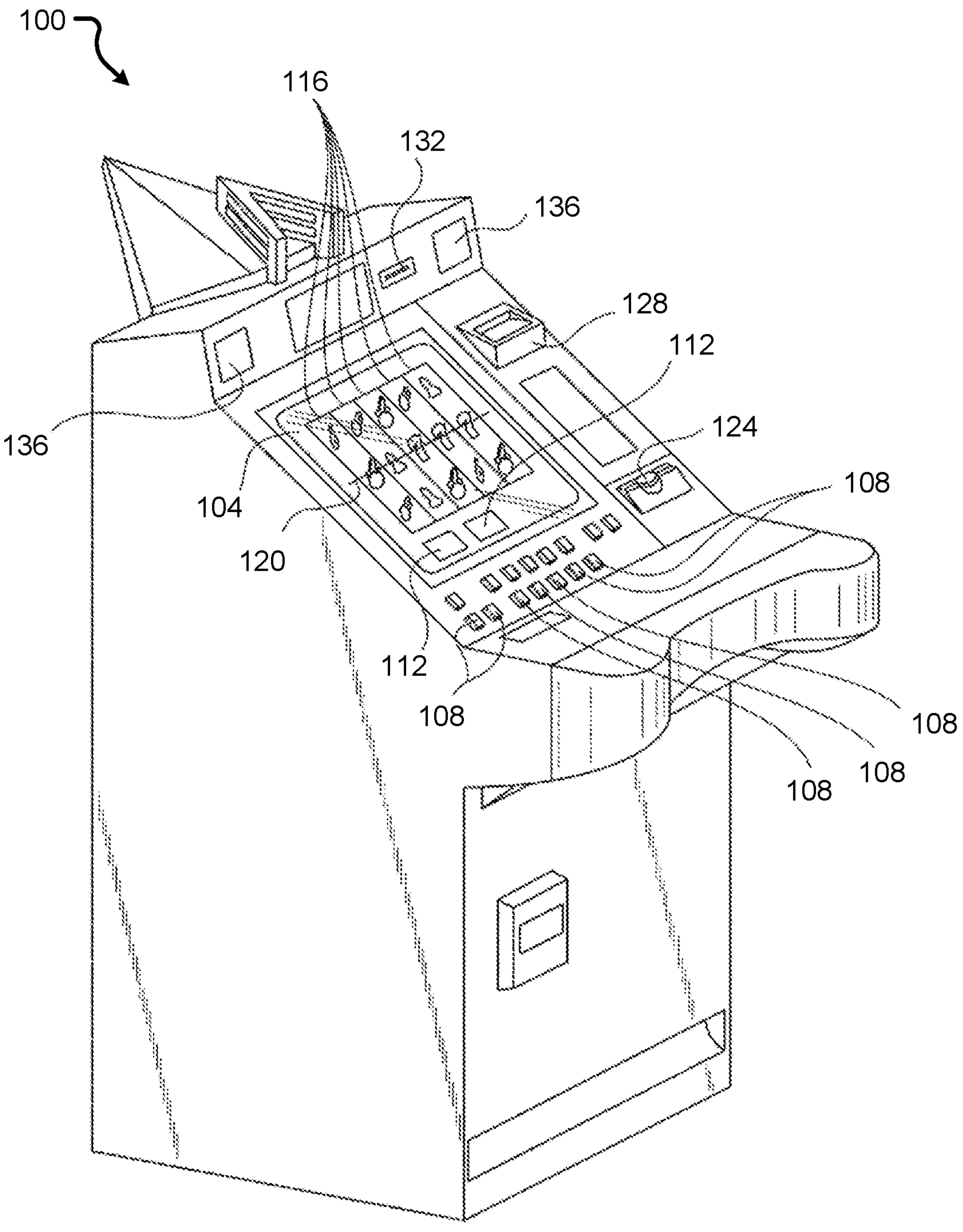
FIG. 1A depicts one example of a computational device in accordance with embodiments of the present disclosure.

Embodiments of the present disclosure will be described in connection with a computational device and, in particular, a computational device, such as a slot machine or Electronic Gaming Machine (EGM), that implements a second game mode. While embodiments of the present disclosure will be described in connection with the example of a slot machine or EGM implementing a second game mode (e.g., increased multipliers, different prizes, etc.), it should be appreciated that embodiments of the present disclosure are not so limited. For instance, other types of computational devices, such as portable user devices, smartphones, tablets, laptops, Personal Computers (PCs), wearable devices, etc. may be used to implement a second game mode as part of a game as described herein. Furthermore, it should be appreciated that embodiments of the present disclosure may apply to games other than slot games. For instance, embodiments of the present disclosure may be used in connection with any type of game, such as bingo, keno, slots, video poker, table games, etc.

In some embodiments, the present disclosure is directed towards linked gaming machines that implement a first game mode (e.g., a base game mode) and a second (enhanced) game mode (such as a frenzy/fever mode) where a player has a fixed amount of time to play at a higher payback percentage. In some embodiments of the second game mode, a player is given a fixed amount of time to play at a higher payback percentage. Stated differently, in the second game mode the player's wagered games are played on a different second paytable than the first paytable of the first game mode, with the second paytable of the second game mode having a higher return to player percentage than the first paytable. The second paytable of the second game mode is implemented using a randomly or pseudo randomly generated or predetermined multiplier higher than that used during the first game mode. For example, during game play the higher random multiplier is applied to all credit, coin, jackpot coin, progressive (whether linked or standalone), and other wins (even a grand jackpot or a linked progressive applying across multiple gaming machines) during the fixed amount of time. In another example, additional lines of game play/game symbols may be activated during the second game mode. In yet another example, a stationary activator may appear during the fixed amount of time. Alternatively or additionally, different prizes or bonuses may be offered during the second game mode.

Triggering of the second game mode is also random (e.g., the second game mode can be triggered in response to occurrence of a selected random or pseudorandom number or set of random or pseudorandom numbers ("selected random number generator output") (which can be depicted by a selected symbol on a reel and/or payline)), in other words, there is not a set amount of time between different second game modes on a common gaming machine. Additionally, when the second mode is triggered on one machine in a bank of linked gaming devices 100*a-n*, a message may be sent to the other linked gaming devices 100*a-n*. The message may be sent from a gaming server (e.g., a gaming server 254 detects the second mode is triggered on one gaming device of a bank of linked gaming devices and the gaming server 254 notifies the other linked gaming devices 100*a-n*), the first triggered gaming device 100*a-n* may notify any linked gaming devices 100*a-n*. and/or the linked gaming devices 100*a-n* may daisy chain the message (e.g., a first gaming device 100 is triggered, which notifies a second gaming device 100, the second gaming device 100 notifies a third gaming device 100 and so on). During a second game mode, the appearance of the game may be altered. For example, different lights and/or sounds may be activated during the second game mode. During a second game mode, the player can also change their wager (e.g., bet up or down) or make a new wager. The second game mode, and the second paytable, typically apply only to wagers made during the fixed amount of time during the second game mode and not the first game mode.

The first and second game modes can use the same or different symbols. Symbols can be any type of symbol including without limitation standard reel icons, wilds, and scatters. In some embodiments, the symbols include an activator symbol, a high symbol, a low symbol, a bonus symbol, and a coin symbol. The symbol can be a major, minor or mini symbol.

The second game mode can apply equally to base games as well as free games or spins, such as occurring in response to a bonus scatter symbol.

In some embodiments, the second game mode can apply simultaneously to multiple linked games of different players or different gaming machines (e.g., gaming machines in a linked or otherwise logically associated bank of gaming machines). Stated differently, occurrence of a selected random or pseudorandom number of a set of random numbers on a reel and/or line (e.g., payline) of any gaming machine in multiple linked gaming machines (typically during gameplay by a player on one of the linked gaming machines) can cause each of the other gaming machines in the multiple linked gaming machines to enter into the second game mode automatically and simultaneously with the same starting and ending times of the fixed amount of time for the second game mode. The various linked gaming machines can be a common type of gaming device or different types of gaming devices, have the same or different types of games, and/or have the same or different themes. The second game mode on each gaming machine in the linked gaming machines starts and ends at common start and end times, respectively. In embodiments, the second game mode may only be triggered when at least one gaming machine of the linked gaming machines is being played. However, once the second game mode is triggered on the bank of linked gaming machines, a player may play any of the linked gaming machines while the second game mode is activated. Any winnings, however, are not typically shared amongst players but tracked independently by the credit meter of each gaming machine to reflect the winnings (whether for credits or jackpot coins on a given gaming machine or a grand jackpot linked across the linked gaming machine) only on the corresponding gaming machine during the second game mode.

The random or pseudorandom number set, the occurrence of a member of which triggers the second game mode, can be the same or different for the different gaming machines in the linked bank of gaming machines. In the latter case, occurrence of a first random or pseudorandom number on a first gaming machine in the bank of gaming machines triggers the second game mode but not when occurring on a different second gaming machine in the bank of gaming machines. Occurrence of a different second random or pseudorandom number on the second gaming machine in the bank of gaming machines triggers the second game mode but not when it occurs on the first second gaming machine in the bank of gaming machines.

In some embodiments, triggering of the second game mode is independent of a clock setting or timer value, such as a time interval since ending of a prior instance of the second game mode. As noted, the second game mode is triggered by occurrence of a selected randomly or pseudo randomly generated number in response to gameplay regardless of when the last instance of the second game mode started or stopped.

The second game mode, when triggered on a given gaming machine in the linked bank of gaming machines, applies not only to gaming machines having credit meter balances at the start of the second game mode (e.g., gaming machines then currently in play by a player) but also to gaming machines having a zero credit meter balance at the start of the second game mode (e.g., gaming machines not in play by a player).

In some embodiments, the gaming machine, in the first and/or second game mode, can use differently triggered activators and/or multipliers associated with different reels that pay different sets of symbol positions on a common payline or other line. For example, occurrence of a first activator on a first reel at a first position on a payline in response to occurrence of a first random or pseudorandom number pays symbols in a first set of positions on the payline (e.g., pays all adjacent symbols) and occurrence of a second activator (which may be represented by the same or different symbol from the first activator) on a second reel at a different second location on the payline in response to occurrence of a different second random or pseudorandom number pays symbols or jackpots in a different second set of positions on the payline (e.g., pays a type of symbol occurring at any position on the payline). The first reel can be associated with a first fixed multiplier and the second reel with a different second fixed multiplier, such that occurrence of the first activator on the first reel causes the first multiplier to apply to the corresponding winnings and occurrence of the second activator occurrence on the second reel causes the second multiplier to apply to the corresponding winnings.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

Figure 1B:
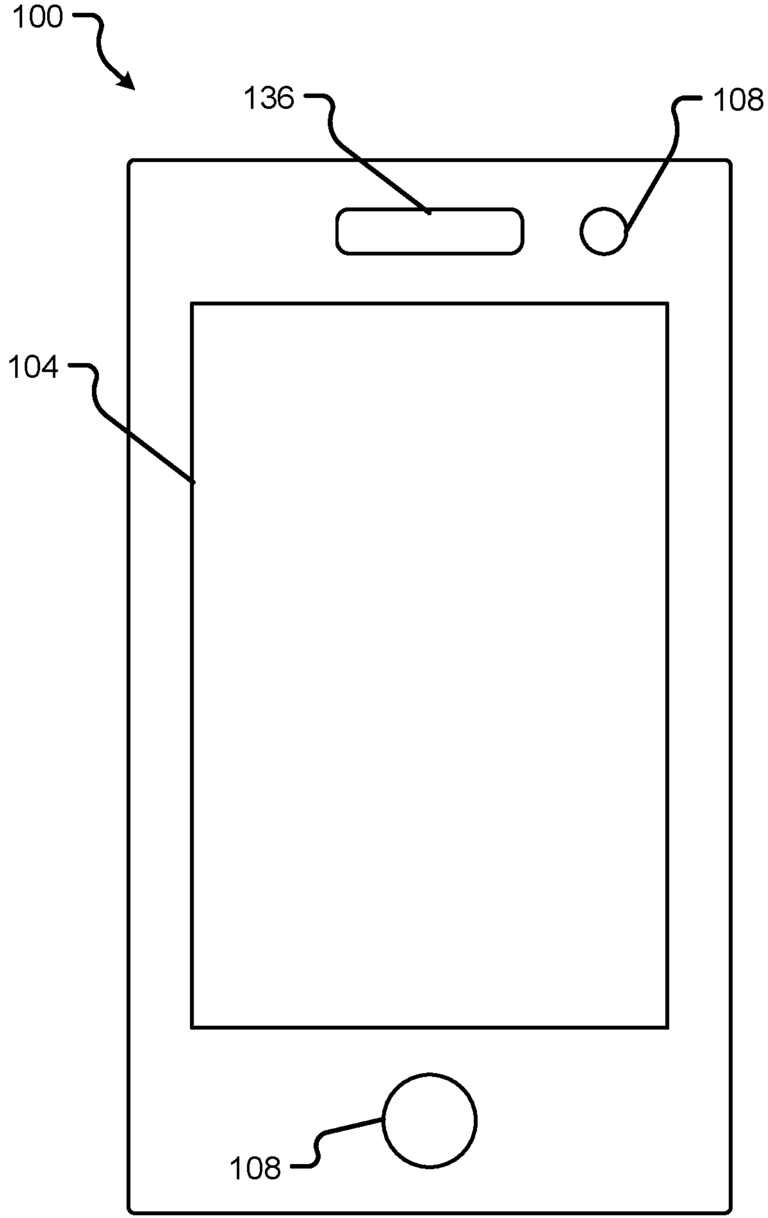
FIG. 1B depicts another example of a computational device in accordance with embodiments of the present disclosure.

With reference now to FIGS. 1A and 1B, an illustrative computational device 100 that may be used to implement a slot game or the like will be described in accordance with at least some embodiments of the present disclosure. A computational device 100 may include a portable or non-portable device used for executing a gaming application or multiple different gaming applications without departing from the scope of the present disclosure. Non-limiting examples of a computational device include an EGM, a Video Gaming Machine (VGM), a mobile communication device (e.g., a smartphone, laptop, wearable device, etc.), a laptop, a PC, etc. An EGM or VGM-type of computational device 100 is shown in FIG. 1A in accordance with embodiments of the present disclosure.

The illustrative computational device 100 of FIG. 1A is shown to include a support structure, housing or cabinet, which provides support for a plurality of displays, inputs, controls and other features of a conventional gaming machine. In the illustrated embodiment, a player plays computational device 100 while sitting; however, the computational device 100 is alternatively configured so that a player can operate it while standing or sitting. The illustrated computational device 100 is positioned on the floor but can be positioned alternatively (i) on a base or stand, (ii) as a pub-style table-top game (e.g., where the participant computational devices are located remotely from the shared wheel as discussed below), (iii) as a stand-alone computational device on the floor of a casino with other stand-alone computational devices, or (iv) in any other suitable manner. The computational device 100 can be constructed with varying cabinet and display configurations.

In one embodiment, a computational device 100 is configured to randomly generate awards and/or other game outcomes based on probability data. Since a computational device 100 generates outcomes randomly or based upon a probability calculation, there is no certainty that the computational device 100 will provide the player with any specific award or other game outcome.

In some embodiments, a computational device 100 may employ a predetermined or finite set or pool of awards, progressive awards, prizes or other game outcomes. As each award or other game outcome is provided to the player, the computational device 100 removes the provided award or other game outcome from the predetermined set or pool. Once removed from the set or pool, the specific provided award or other game outcome cannot be provided to the player again. The computational device 100 provides players with all of the available awards or other game outcomes over the course of the play cycle and guarantees a designated amount of actual wins and losses.

The computational device 100 may include one or more displays 112. An illustrative display 112 may include a credit display that displays a player's current number of credits, cash, account balance or the equivalent. Another illustrative display 112 may include a bet display that displays a player's amount wagered.

The computational device 100 is also shown to include at least one payment acceptor. Illustrative payment acceptors may include, without limitation, a coin slot 124, where the player inserts coins or tokens, and a ticket, note or bill acceptor 128, where the player inserts a bar-coded ticket, note, or cash. In one embodiment, a player-tracking card, credit card, debit card or data card reader/validator 132 is also provided for accepting any of those or other types of cards as a form of payment toward playing a game on the computational device 100.

In one embodiment, a player inserts an identification card into card reader 132 of computational device 100. The identification card can be a smart card having a programmed microchip or a magnetic strip coded with a player's identification, credit totals and other relevant information. In one embodiment, money may be transferred to computational device 100 through an electronic fund transfer and card reader 132 using the player's credit, debit or smart card. When a player funds computational device 100, a processor of the computational device 100 may determine the amount of funds entered and the corresponding amount is shown on the credit or other suitable display 112 as described above.

In one embodiment, after appropriate funding of computational device 100, the player presses an input device 108 to initiate game play. Input devices 108 may include various types of buttons, levers, gesture inputs, etc. that enable a player to start any game play or sequence of events. In one embodiment, upon appropriate funding, computational device 100 begins game play automatically. In another embodiment, the player needs to actuate or activate one of the play buttons to initiate play of computational device 100. Other non-limiting types of input devices 108 may include a bet one button, a max bet button, or any other type of button known to be included in an EGM, VGM, or the like. It should further be appreciated that the input devices 108 may correspond to a physical button, a virtual button on a touch-screen of a game, an input element on a Graphical User Interface (GUI), or a combination thereof. In other words, the input devices 108 do not need to correspond to a physical button.

In some embodiments, the player places a bet by pushing a bet one button. The player may increase the player's wager by one credit each time the player pushes the bet one button. When the player pushes the bet one button, the number of credits shown in the credit display decreases by one, and the number of credits shown in the bet display increases by one. A max bet button can also be provided, which enables the player to bet the maximum wager (e.g., max lines, max wager per line, and re-spin operation). Computational device 100 may include other suitable wager buttons, such as a repeat bet button, one or more select pay lines buttons, a select re-spin operation button, and one or more select wager per pay line buttons.

Another type of input device 108 that may be provided on the computational device 100 is a physical cash out button, a virtual cash out button, a selectable GUI element, or the like. The player presses a cash out button and cashes out to receive a cash payment or other suitable form of payment corresponding to the number of remaining credits. The player can receive coins or tokens in a coin payout tray or a ticket or credit slip, which are redeemable by a cashier or funded to the player's electronically-recordable identification card.

The computational device 100 may also include one or more display screens 104 and one or more sound-generating devices 136 (e.g., speaker(s)). The combination of outputs provided on a display screen 104 and sound-generating device 136 may contribute to the game play experience and, in some embodiments, may provide the player with information regarding a status of a game play event or sequence of events.

In one embodiment, the sound-generating device 136 may include at least one speaker or other type of transducer for generating audible sounds, playing music, etc. In one embodiment, a computational device 100 provides dynamic sounds coupled with attractive multimedia images displayed on display screen 104 to provide an audio-visual representation or to otherwise display full-motion video with sound to attract players to computational device 100. During idle periods, the computational device 100 displays a sequence of audio and/or visual attraction messages to attract potential players to computational device 100.

In one embodiment, a base or primary game includes a slot game with one or more pay lines 120. As will be discussed in further detail herein, the game provided by the computational device 100 may support one or multiple pay lines 120, which may extend across the display screen 104 vertically, horizontally, diagonally, at adjusted angles, etc. In some embodiments, such as for a slot game, a pay line 120 intersects a plurality of reels 116, such as three to five reels. Each reel 116 of the display screen 104 may be used to display different sets of symbols in connection with game play activity provided by the computational device 100. In some embodiments, each reel 116 may operate independent of all other reels and the symbols displayed by a reel 116 at the end of a given spin may depend upon random numbers generated by the computational device 100.

The reels 116 may be provided as mechanical rotating reels, electromechanical rotating reels, and/or in video form with simulated reels being displayed via the display screen 104. A reel 116 may be used to display any number of symbols such as bells, hearts, fruits, numbers, letters, bars or other images, which preferably correspond to a theme associated with a game provided by the computational device 100. With a slot game, computational device 100 may be configured to award prizes, awards, or other game play opportunities when the reels 116 stop spinning and a predetermined symbol combination lands across an active pay line 120 (e.g., a pay line 120 that is currently being wagered and is subject to evaluation for a win after the reels 116 have stopped spinning).

FIG. 1B illustrates another example of a computational device 100 in accordance with at least some embodiments of the present disclosure. This particular example of computational device 100 may correspond to a portable computational device 100 such as a mobile smartphone, tablet, wearable, etc. The computational device 100 may be owned by a user of the device 100 rather than being owned by a casino operator.

The computational device 100 again includes a display screen 104, a plurality of input devices 108, and at least one speaker 136. In some embodiments, the display screen 104 may correspond to a touch-sensitive display screen, meaning that the display screen 104 is simultaneously capable of displaying information (e.g., in connection with game play activity) and receiving a user input. In some embodiments, the touch-sensitive display screen 104 may provide game features similar to a cabinet-style computational device 100 without requiring all of the dedicated buttons provided by a cabinet-style computational device 100.

Figure 2A:
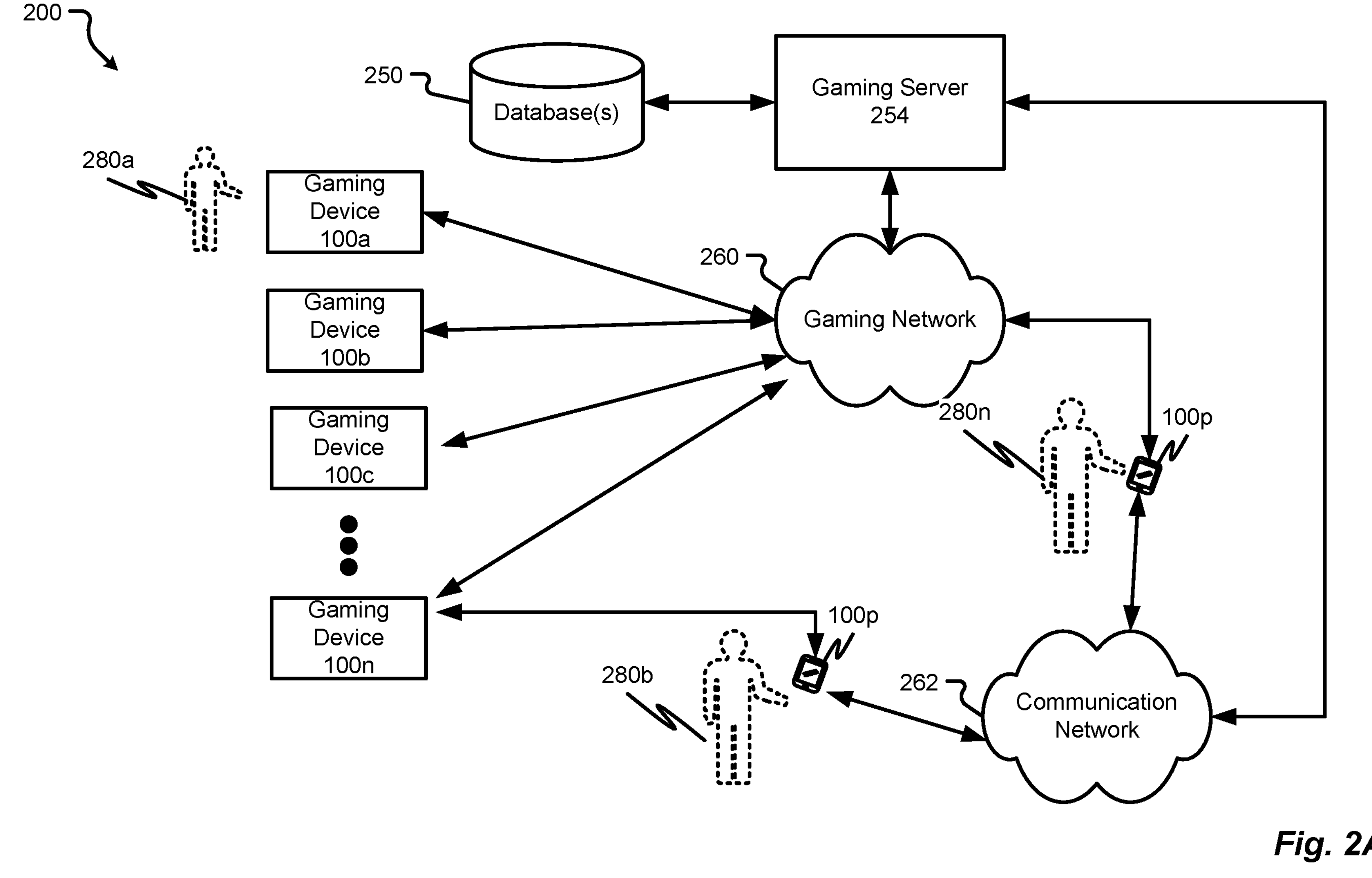
FIG. 2A depicts one example of a gaming environment in accordance with embodiments of the present disclosure.

With reference now to FIG. 2A, details of an illustrative gaming system 200 will be described in accordance with at least some embodiments of the present disclosure. The components of the gaming system 200, while depicted as having particular instruction sets and devices, is not necessarily limited to the examples depicted herein. Rather, a system according to embodiments of the present disclosure may include one, some, or all of the components depicted in the system 200 and does not necessarily have to include all of the components in a single device. The illustration of a single central gaming server 254 is for ease of discussion and should not be construed as limiting embodiments of the present disclosure to a single-server architecture.

The gaming system 200 is shown to include a gaming network 260 and a communication network 262. The gaming network 260 may correspond to a distributed set of devices that interconnect and facilitate machine-to-machine communications between one or multiple gaming devices 100*a-n* and the gaming server 254.

The communication network 262 may correspond to a distributed set of devices that interconnect and facilitate machine-to-machine communications between the gaming server 254 and personal gaming devices 100 carried by a player 280. In some embodiments, the gaming network 260 and communication network 262 may correspond to different networks administered and/or maintained by different entities. In such a scenario, one or more of a gateway, firewall, or similar network border device may reside between the gaming network 260 and the communication network 262 (e.g., to maintain security preferences/settings of each network). In another possible scenario, the gaming network 260 and communication network 262 may correspond to the same or similar network. As a non-limiting example of the second scenario, the gaming network 260 and communication network 262 may both correspond to a distributed Internet Protocol (IP)-based communication network, such as the Internet.

The gaming network 260 and communication network 262 may include any type of known communication medium or collection of communication media and may use any type of protocols to transport messages between devices. As some non-limiting examples, the gaming network 260 may correspond to a WAN or LAN in which the plurality of gaming devices 100*a-n* are configured to communicate with the gaming server 254 using devices that are owned and administered by the same entity that administers security settings of the gaming devices 100*a-n*. As such, the gaming network 260 may be considered a secure or trusted network.

The communication network 262, in some embodiments, may also include a WAN or LAN. Alternatively or additionally, the communication network 262 may include one or more devices that are not administered by the same entity administering the gaming devices 100*a-n*. Thus, the communication network 262 may be considered an untrusted or unsecure network from the perspective of the gaming network 260. The Internet is an example of the communication network 262 that constitutes an IP network consisting of many computers, computing networks, and other communication devices located all over the world, which are connected through many telephone systems and other means. Other examples of the communication network 262 include, without limitation, a standard Plain Old Telephone System (POTS), an Integrated Services Digital Network (ISDN), the Public Switched Telephone Network (PSTN), a cellular network, and any other type of packet-switched or circuit-switched network known in the art. In some embodiments, the communication network 262 may be administered by a Mobile Network Operator (MNO) whereas a gaming entity may administer the gaming network 260.

It should be appreciated that the gaming network 260 and/or communication network 262 need not be limited to any one network type, and instead may be comprised of a number of different networks and/or network types. Moreover, the gaming network 260 and/or communication network 262 may comprise a number of different communication media such as coaxial cable, copper cable/wire, fiber-optic cable, antennas for transmitting/receiving wireless messages, wireless access points, routers, and combinations thereof.

In some embodiments, the gaming devices 100*a-n* may be distributed throughout a single property or premises (e.g., a single casino floor) or the gaming devices 100*a-n* may be distributed among a plurality of different properties. In a situation where the gaming devices 100*a-n* are distributed in a single property or premises, the gaming network 260 may include at least some wired connections between network nodes (e.g., a LAN or multiple LANs). As a non-limiting example, the nodes of the gaming network 260 may communicate with one another using any type of known or yet-to-be developed communication technology. Examples of such technologies include, without limitation, Ethernet, SCSI, PCIe, RS-232, RS-485, USB, ZigBee, Wi-Fi, CDMA, GSM, HTTP, TCP/IP, UDP, etc.

The gaming devices 100*a-n* may utilize the same or different types of communication protocols to connect with the gaming network 260. It should also be appreciated that the gaming devices 100*a-n* may or may not present the same type of game to a player 280. It should be appreciated that a gaming device 100*a-n* may correspond to one example of a gaming device. It should also be appreciated that the functions and features described in connection with a gaming device 100*a-n* may be provided in any other type of gaming device without departing from the scope of the present disclosure.

In some embodiments, the gaming devices 100*a-n* may be configured to communicate with a centralized management server in the form of the central gaming server 254. The central gaming server 254 may be configured to centrally manage games of chance, games of skill, or hybrid games of chance/skill played at the gaming devices 100*a-n* (e.g., slot games), enable execution of a different game (e.g., a card game), monitor player 280 activity at the gaming devices 100*a-n*, track player 280 association with a gaming device 100*a-n*, facilitate communications with players 280 via the gaming devices 100*a-n*, facilitate communications with players 280 via the personal gaming devices 100*p* (or other gaming devices), and/or perform any other task in connection with games played by a player 280 at gaming devices.

In some embodiments, a player 280 may be enabled to enhance their experience with the gaming devices 100*a-n* via interactions with their personal gaming device 100*p*. In some embodiments, the personal gaming device 100*p* may be considered a mobile device or another example of a gaming device 100*a-n*. In some embodiments, the personal gaming device 100*p* is configured to be owned and carried by a player 280. For instance, a player 280 may be allowed to play a game at their personal gaming device 100*p* without ever having to physically engage a gaming device 100*a-n*. The personal gaming device 100*p* may correspond to a mobile communication device, such as a smartphone, tablet, laptop, PDA, wearable device, an augmented reality headset, a virtual reality headset, or the like. In other embodiments, the personal gaming device 100*p* may correspond to a PC, gaming device. Any of the above-mentioned examples of a personal gaming device 100*p* may correspond to an example of a gaming device as described herein.

In some embodiments, a personal gaming device 100*p* may be configured to communicate directly with a gaming device 100*a-n*. In some embodiments, some or all of the game play may be achieved with the personal gaming device 100*p* rather than relying on the use of a gaming device 100*a-n*. Where a personal gaming device 100*p* interacts with a gaming device 100*a-n*, direct machine-to-machine communications may utilize a proximity-based communication protocol such as NFC, Bluetooth®, BLE, Wi-Fi, or the like. Alternatively or additionally, the personal gaming devices 100*p* may be configured to communicate with other personal gaming devices 100*p* and/or the central gaming server 254 via the communication network 262. Such communications may be secured (e.g., encrypted) or unsecured depending upon the nature of information exchanged during the communications. A personal gaming device 100*p* may correspond to a player's 280 personal mobile device that uses an unsecured or untrusted communication network 262 or to a device issued to the player 280 during the player's visit at a particular casino, in which case the personal gaming device 100*p* may be administered with certain casino-approved security policies.

It should be appreciated that the central gaming server 254 may or may not be co-located with the gaming devices 100*a-n*. Further still, players 280 may be allowed to carry multiple personal gaming devices 100*p*, which may or may not be required to communicate or pair with a gaming device 100*a-n*.

FIG. 1 also depicts the possibility of some personal gaming devices 100*p* being paired with a gaming device 100*a-n*, thereby enabling communications to flow between the personal gaming device 100*p* and gaming device 100*a-n*. This communication may utilize a proximity-based communication protocol, such as Bluetooth, BLE, NFC, Wi-Fi, etc. FIG. 1 further shows that one or more personal gaming devices 100*p* of a player 280 may not necessarily be paired with a gaming device 100*a-n*, but such personal gaming devices 100*p* may still be configured to communicate with the central gaming server 254 via the communication network 262. Communications between the gaming device 100*a-n* and personal gaming device 100*p* may facilitate any number of combinations of gameplay opportunities.

The central gaming server 254 is in communication, via the gaming network 260, with one or more databases 250. The databases 250 may be configured to store one or multiple data structures that are used in connection gaming interactive activities of players 280 and the gaming system 200. The databases 250 can use any database model and compatible database management system. Examples of database models include relational databases, object-oriented databases, and non-relational databases, such as NoSQL and NewSQL databases.

Figure 2B:
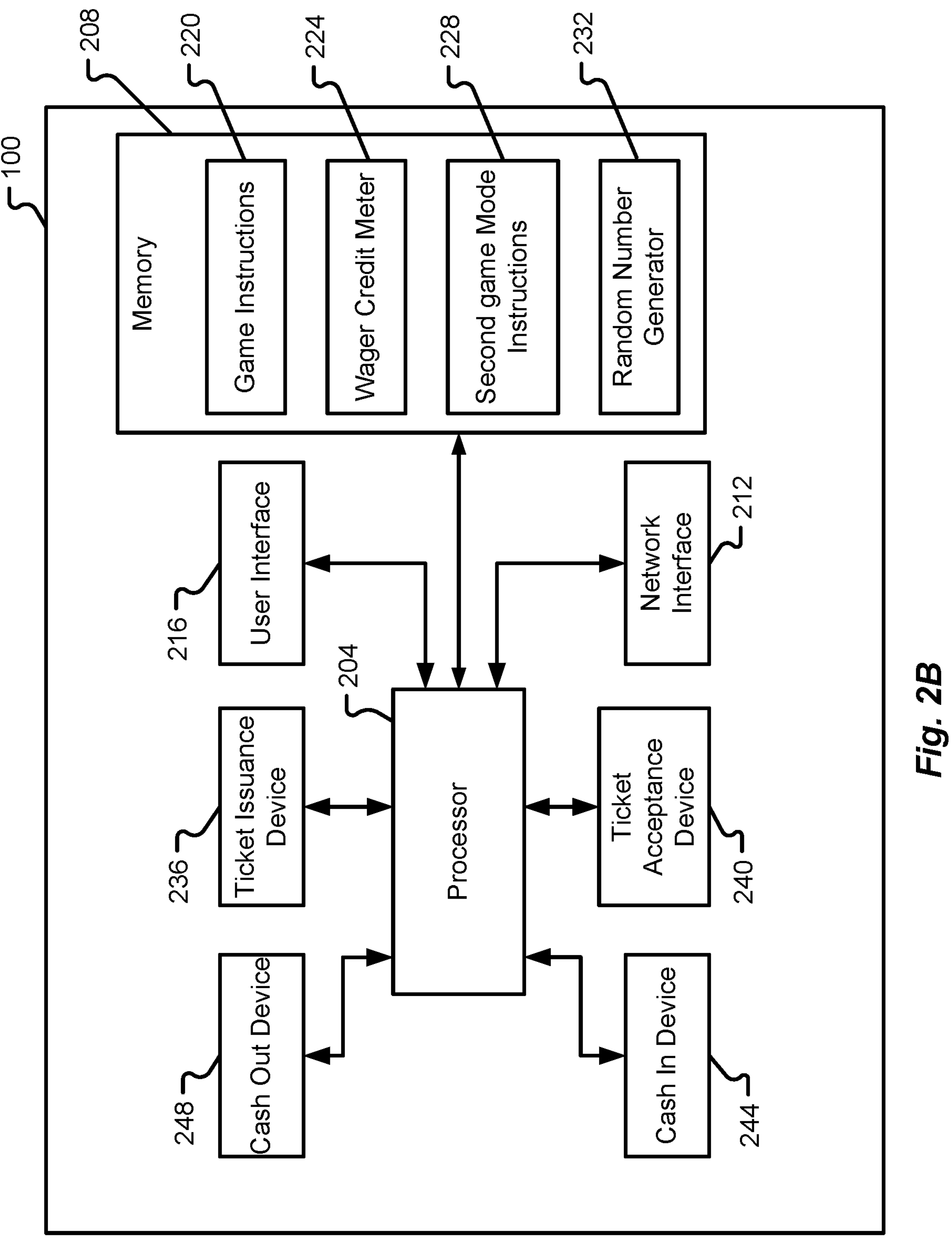
FIG. 2B is a block diagram depicting components of a computational device in accordance with embodiments of the present disclosure.

With reference to FIG. 2B, additional details of the components that may be included in a gaming device 100*a-n* or any other gaming device will be described in accordance with at least some embodiments of the present disclosure.

The computational device 100 is shown to include a processor 204, memory 208, a network interface 212, and a user interface 216. In some embodiments, the processor 204 may correspond to one or many microprocessors, CPUs, microcontrollers, Integrated Circuit (IC) chips, or the like. The processor 204 may be configured to execute one or more instruction sets stored in memory 208. In some embodiments, the instruction sets stored in memory 208, when executed by the processor 204, may enable the computational device 100 to provide game play functionality.

The nature of the network interface 212 may depend upon whether the network interface 212 is provided in cabinet-style computational device 100 or a mobile computational device 100. Examples of a suitable network interface 212 include, without limitation, an Ethernet port, a USB port, an RS-232 port, an RS-485 port, a NIC, an antenna, a driver circuit, a modulator/demodulator, etc. The network interface 212 may include one or multiple different network interfaces depending upon whether the computational device 100 is connecting to a single communication network or multiple different types of communication networks. For instance, the computational device 100 may be provided with both a wired network interface 212 and a wireless network interface 212 without departing from the scope of the present disclosure.

The user interface 216 may include a combination of the user input and user outputs described in connection with FIGS. 1A and 1B. For instance, the user interface 216 may include the display screen 104, the input devices 108, the speakers 136, or any other component that is capable of enabling user interaction with the computational device 100. The user interface 216 may also include one or more drivers for the various hardware components that enable user interaction with the computational device 100.

The memory 208 may include one or multiple computer memory devices that are volatile or non-volatile. The memory 208 may be configured to store instruction sets that enable player interaction with the computational device 100 and that enable game play at the computational device 100. Examples of instruction sets that may be stored in the memory 208 include a game instruction set 220, a credit meter 224, and a second game mode instruction set 228. In addition to the instruction sets, the memory 208 may also be configured to store a random number generator 232 that is used by the game instruction set 220, for example, to provide game outputs.

In some embodiments, the game instruction set 220, when executed by the processor 204, may enable the computational device 100 to facilitate one or more games of chance or skill and produce interactions between the player and the game of chance or skill. In some embodiments, the game instruction set 220 may include subroutines that present one or more graphics to the player via the user interface 216, subroutines that calculate whether a particular wager has resulted in a win or loss during the game of chance or skill, subroutines for determining payouts for the player in the event of a win, subroutines for exchanging communications with another device, such as a server, subroutines for determining re-spin opportunities during game play, and any other subroutine useful in connection with facilitating game play at the computational device 100.

In some embodiments, the game instruction set 220 may include instructions that initiate a reel spin at the various reels 116 in connection with game play. In some embodiments, the random number generator 232 is used to determine a final position of the reels 116 after the spin is completed. The game instruction set 220 may also be configured to present symbols via the display screen 104 when the reels 116 correspond to video reels or the like. The game instruction set 220 may also be configured to evaluate a position of symbols relative to one or more pay lines 120, relative to predetermined symbol areas, and any other evaluation desired to facilitate game play.

The credit meter 224 may correspond to an instruction set within the computational device 100 that facilitates a tracking of wager activity at the computational device 100. In some embodiments, the credit meter 224 may be used to store or log information related to various player activities and events that occur at the computational device 100. The types of information that may be maintained in the credit meter 224 include, without limitation, player information, available credit information, wager amount information, and other types of information that may or may not need to be recorded for purposes of accounting for wagers placed at the computational device 100 and payouts made for a player during a game of chance or skill played at the computational device 100.

In some embodiments, the credit meter 224 may be configured to track coin in activity, coin out activity, coin drop activity, jackpot paid activity, credits applied activity, external bonus payout activity, voucher in activity, voucher out activity, spin discounts, timing of events that occur at the computational device 100, and the like. In some embodiments, certain portions of the credit meter 224 may be updated in response to outcomes of a game of chance or skill played at the computational device 100.

The second game mode instruction set 228 may correspond to a subroutine that is called by the game instruction set 220 during game play. In some embodiments, the second game mode instruction set 228 may be called by the game instruction set 220 when the game instruction set when a second game mode is triggered during the gameplay operation.

In some embodiments, the second game mode instruction set 228 is configured, when executed by the processor 204, to during game play of a base game on a gaming device, randomly activate a second game mode, wherein the second game mode is activated for a predetermined amount of time.

While shown as separate instruction sets, it should be appreciated that the second game mode instruction set 228 may correspond to a subroutine of the game instruction set 220 without departing from the scope of the present disclosure. Additional details and functional capabilities of the second game mode instruction set 228 working in cooperation with the game instruction set 220 will be described in connection with FIGS. 3-4.

The computational device 100 is further shown to include a ticket issuance device 236, a ticket acceptance device 240, a cash in device 244, and a cash out device 248. The ticket issuance device 236 may be configured to receive physical tickets, vouchers, or player loyalty cards. In some embodiments, the ticket issuance device 236 and ticket acceptance device 240 may operate in concert with the ticket acceptor 128. In such an embodiment, the ticket acceptor 128 may correspond to the physical components that receive and issue a ticket or voucher whereas the ticket acceptance device 240 and ticket issuance device 236 correspond to the drivers and/or firmware components that control operation of the ticket acceptor 128. It should also be appreciated that the card reader 132 may be in communication with the ticket issuance device 236 and ticket acceptance device 240 and may have functionality driven by one or both of these devices. For instance, the card reader 132 may correspond to the physical hardware components that receive information from a player loyalty card (or player loyalty application on a mobile communication device) and that information may be processed by the ticket acceptance device 240 when receiving player credits from cards read by the card reader 132. The ticket issuance device 236 may provide the card reader 132 with information for applying wager credits back to a player card when a player is done with a game play session and wishes to transfer credits from the credit meter 224 back onto their card. Thus, the ticket issuance device 236 and ticket acceptance device 240 may also operate as a driver and/or firmware component for the card reader 132.

Similarly, the cash in device 244 and cash out device 248 may include or operate in concert with the coin slot 124 and any coin delivery mechanisms. The cash in device 244 and cash out device 248 may include hardware, drivers, or firmware that facilitate receiving or distributing cash, tokens, bills, etc. In some embodiments, the cash in device 244 may be configured to determine an amount of cash (e.g., in coins, bills, etc.), an amount of tokens, etc., input at the coin slot 124 and convert the values into credits for playing games with the game instruction set 220. The cash out device 248 may correspond to hardware and software configured to output coins, tokens, bills, etc. if a player decides to cash out or convert playing credits back into cash, tokens, bills, etc.

Figure 2C:
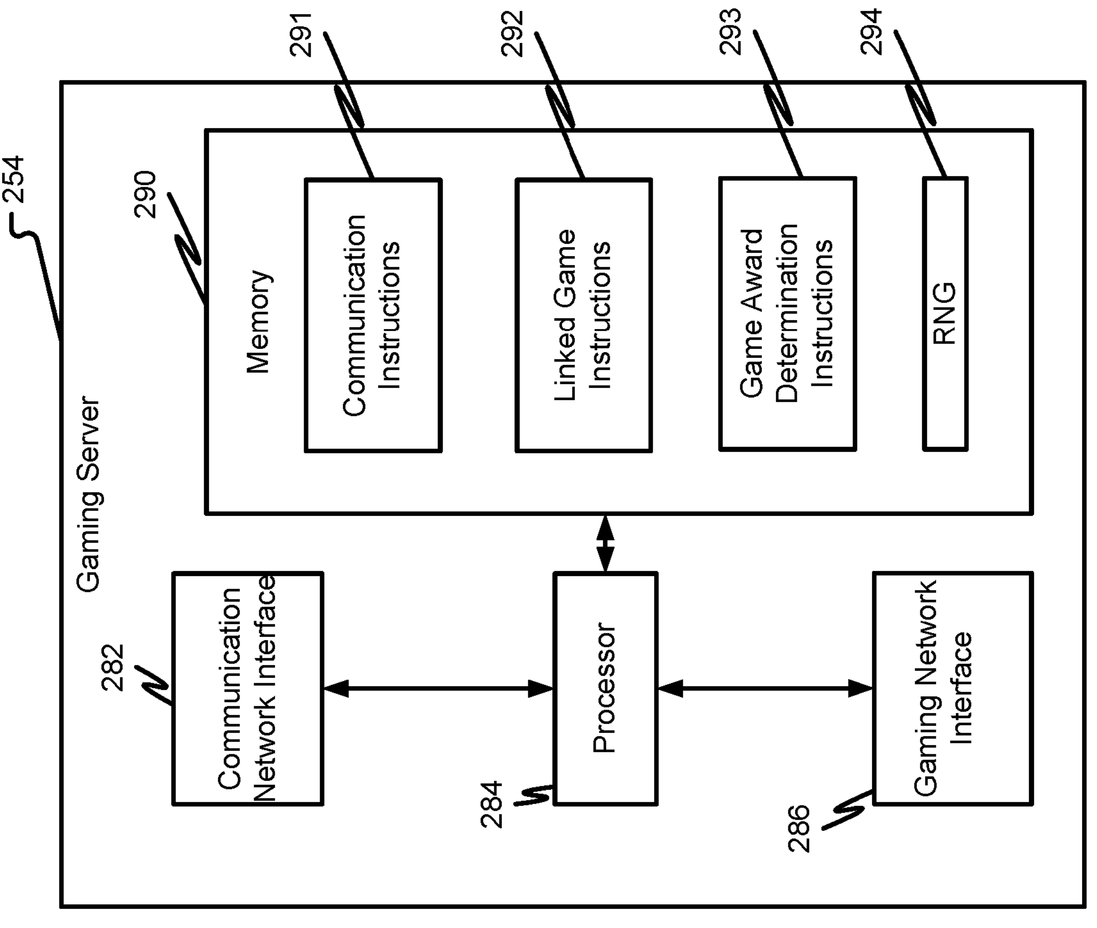
FIG. 2C is a block diagram depicting components of a gaming server in accordance with embodiments of the present disclosure.

With reference now to FIG. 2C additional details of a central gaming server 254 (hereinafter referred to as "gaming server") will be described in accordance with embodiments of the present disclosure. The gaming server 254 is shown to include a processor 204, memory 290, and a gaming network interface 286. These resources may enable functionality of the gaming server 254 as will be described herein. For instance, the gaming network interface 286 may provide the gaming server 254 with the ability to send and receive communication packets or the like over the gaming network 260. The gaming network interface 286 may be provided as a network interface card (NIC), a network port, drivers for the same, and the like. Communications between the components of the gaming server 254 and other devices connected to the gaming network 260 may all flow through the gaming network interface 286.

The gaming server 254 is also shown to include a communication network interface 282 that facilitates communications with the personal gaming devices 100_p_ via the communication network 262. In some embodiments, the communication network interface 282 may be similar to the gaming network interface 286. For instance, the communication network interface 282 may also include a NIC, network port, drivers for the same, and the like. In some embodiments, the communication network interface 282 and gaming network interface 286 may be provided in a single physical component or set of components, but may correspond to different communication channels (e.g., software-defined channels, frequency-defined channels, amplitude-defined channels, etc.) that are used to send/receive different communications to the personal gaming devices 100_p_ as compared to the gaming devices 100_a-n_. In some embodiments, a single communication interface may facilitate communications with both the gaming devices 100_a-n_ and personal gaming devices 100_p_, especially if both devices communicate with the gaming server 254 via a common network.

The processor 284 may correspond to one or many computer processing devices. The processor 284 may be configured to execute one or more instruction sets stored in memory 290. Upon executing the instruction sets stored in memory 290, the processor 284 enables various authentication functions of the gaming server 254.

The memory 290 may include any type of computer memory device or collection of computer memory devices. The illustrative instruction sets that may be stored in memory 290 include, without limitation, the communication instruction set 291, linked game instructions 292, game award determination instruction set 293, and random number generator 294 that is used by the game instruction set 220/linked game instruction set 292, for example, to provide game outputs. Functions of the gaming server 254 enabled by these various instruction sets will be described in further detail herein. It should be appreciated that the instruction sets depicted in FIG. 2C may be combined (partially or completely) with other instruction sets or may be further separated into additional and different instruction sets, depending upon configuration preferences for the gaming server 254. Said another way, the particular instruction sets depicted in FIG. 2C should not be construed as limiting embodiments described herein.

Although not depicted, the gaming server 254 may include instructions that enable a processor to store data into the database(s) 250. Alternatively or additionally, the stored data may be stored internal to the gaming server 254 (e.g., within the memory 290 of the server 254 rather than in a separate database).

The communication instruction set 291, when executed by the processor 284, may enable the gaming server 254 to communicate with the other devices in the system 200. For instance, the communication instruction set 291 may be configured to modulate/demodulate communications exchanged over the gaming network 260 and/or communication network 262, determine timings associated with such communications, determine addresses associated with such communications, etc. In some embodiments, the communication instruction set 291 may be configured to allocate communication ports of the gaming server 254 for use as either the communication network or gaming network interface 282, 286 as appropriate. The communication instruction set 291 may further be configured to generate messages in accordance with communication protocols used by the networks 260, 262 and to parse messages received via the networks 260, 262.

Figure 3:
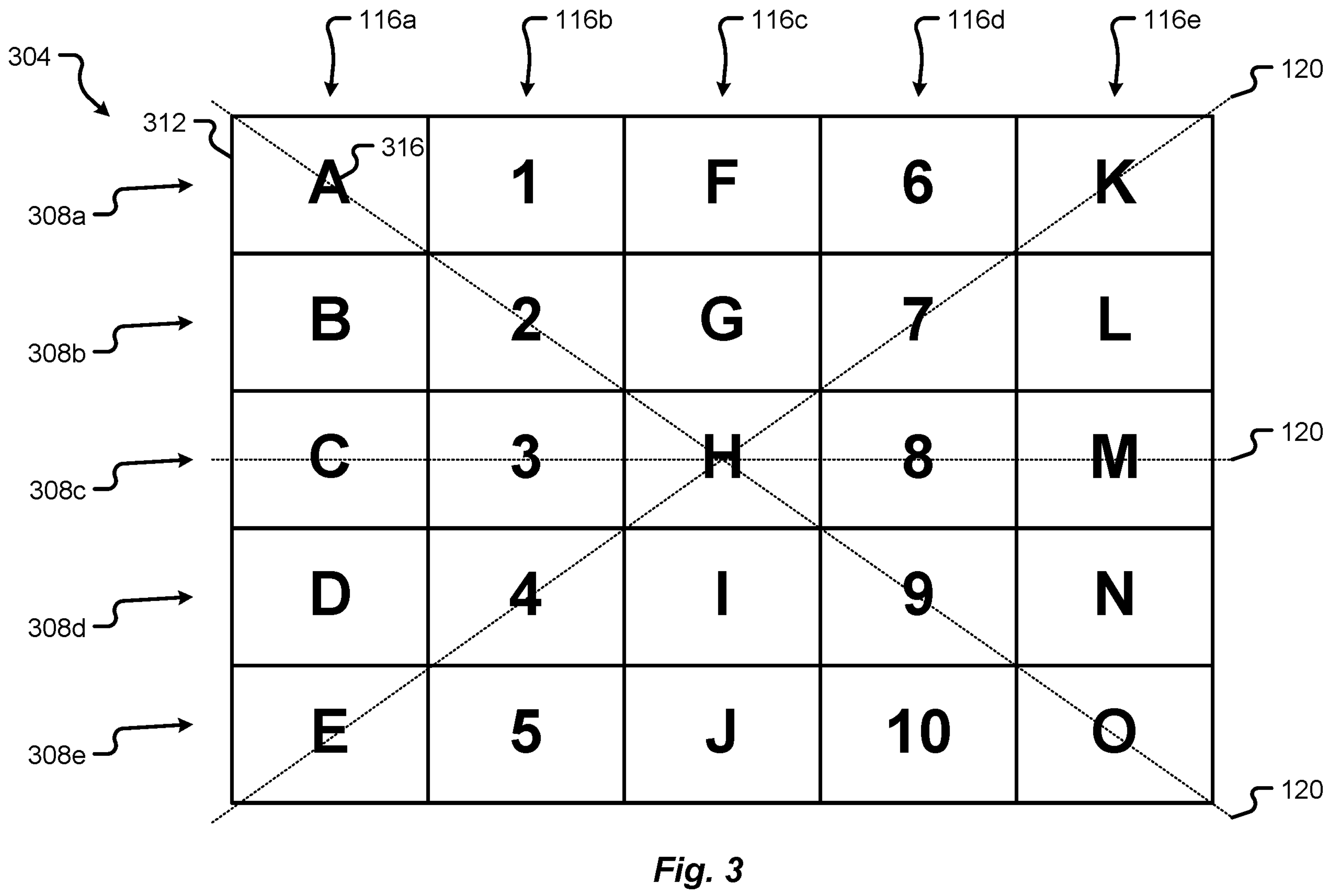
FIG. 3 is an illustrative layout of symbols within an array of symbol areas in accordance with embodiments of the present disclosure.

The game award determination instruction set 293, when executed by the processor 284, may determine an award based an arrangement of symbols as depicted in FIG. 3.

The random number generator ("RNG") 294 generates a distribution of numbers or game symbols that is not reasonably predictable by a random chance and that is used by the game instruction set 220/linked game instruction set 292, for example, to provide game outputs. The random number generator output can be dynamically to alter game parameters. Random number generators can be truly random hardware random generators (HRNGS), which generate random numbers as a function of current value of some physical environment attribute that is constantly changing in a manner that is practically impossible to model, or pseudo-random number generators (PRNGS), which generate numbers that look random, but are actually deterministic, and can be reproduced if the state of the PRNG were known. In some applications, the random number generator 294 uses computational algorithms that can produce long sequences of apparently random results, which are in fact determined by a shorter initial value, known as a seed value or key.

In one embodiment, the random number generator 294 is a PRNG, which constantly generates a sequence of simulated random numbers, at a rate of hundreds or perhaps thousands per second. As soon as an input for game is requested from a player, the gaming device, or the gaming server, the most recent random number is used to determine the result. This means that the result varies depending on exactly when the game is played.

Referring initially to FIG. 3, a first layout of an array of symbol areas 304 will be described in accordance with embodiments of the present disclosure. The array of symbol areas 304 may be presented with the display screen 104. In some embodiments, the game instruction set 220 may control which particular symbols 316 are presented within a particular symbol area 312. The illustrative array of symbol areas 304 is shown to include five columns 116*a*, 116*b*, 116*c*, 116*d*, 116*e* of symbol areas 312 and five rows 308*a*, 308*b*, 308*c*, 308*d*, 308*e* of symbol areas 312. Although FIG. 3 illustrates a 5×5 array of symbol areas 304, it should be appreciated that embodiments of the present disclosure can be implemented in an array of symbol areas 304 having a variety of sizes. For instance, embodiments of the present disclosure may be used in an array of symbol areas 304 that are 3×3, 3×5, 5×3, 7×3, 10×5, 10×10, etc. The example layout of the array of symbol areas 304 should not be construed as limiting embodiments of the present disclosure.

As can be seen in FIG. 3, each symbol area 312 in the array of symbol areas 304 may be populated with a single symbol 316. In other words, after the game instruction set 220 has applied a random number generator 232 to determine symbol 316 placement throughout the array of symbol areas 304, there will be a 1:1 correlation of symbols 316 to symbol areas 312. Each column 116*a*, 116*b*, 116*c*, 116*d*, 116*e* may also be referred to as a reel 116, particularly in the event that the game instruction set 220 provides a slot game. If a slot game is implemented, then the reels 116 (mechanical or video) are spun (physically or virtually) and their final position after the spin is determined, at least in part, with assistance of the random number generator 232.

In some embodiments, payouts or other predetermined game outcomes (e.g., bonus spin opportunities, prize wins, cash wins, re-spin bonus play, etc.) may be determined based on a symbol combination that falls on a pay line 120 that was subject to a wager prior to the spin. In some embodiments, a plurality of the pay lines 120 may be selected for "play" prior to a spin, meaning that any pay line 120 selected for "play" will be evaluated for a predetermined symbol combination.

Figure 4A:
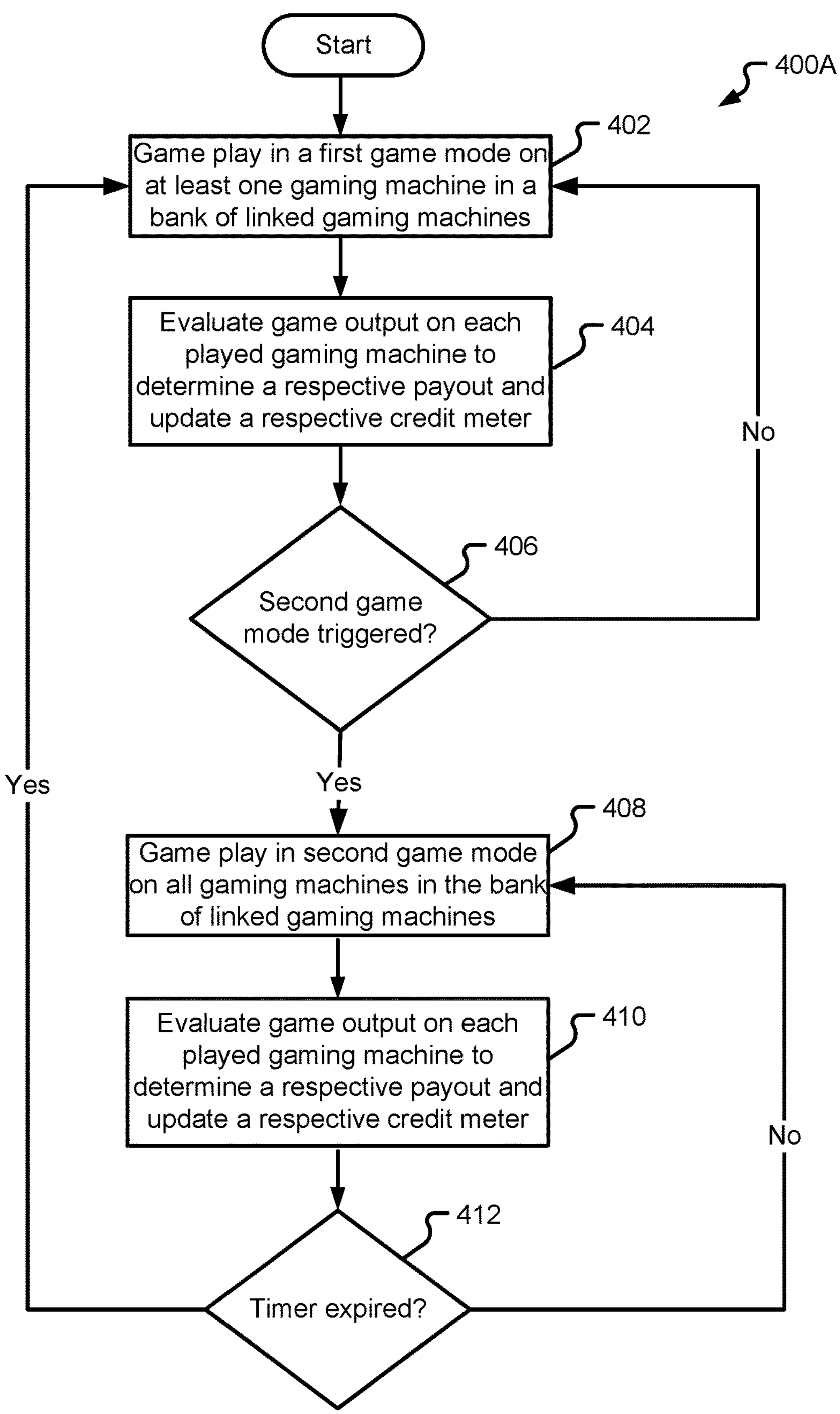
FIGS. 4A-B are flow charts illustrating a game play method with a second game mode in accordance with embodiments of the present disclosure.

With reference now to FIG. 4A, a method 400A of operating a computational device 100 with a possibility of a second game mode will be described in accordance with at least some embodiments of the present disclosure.

The method 400A begins when game play is initiated by a player on at least one gaming device, gaming machine, or computational device 100 in a bank of linked computational devices 100 (e.g., a wager is received). This step may occur in response to the player selecting a predetermined input device 108, e.g., a button, inserting coins, cash, tickets, vouchers, etc., or performing some other action at the computational device 100 that indicates a desire to begin game play.

The method 400A may continue by the game instruction set 220 initiating game play in a first game mode on at least one computational device 100 in a bank of linked computational devices 100 (step 402). Game play may comprise a reel spin that leverages the random number generator 232 to determine a final position of symbols. For example, a bank of linked computational devices 100 may comprise three or more computational devices 100, and a player is playing at least one of the computational devices 100 in the bank of linked computational devices 100.

In step 404, game output of each played computational device 100 is evaluated to determine a respective payout amount and a respective credit meter is updated accordingly. For example, the position of symbols within the array of symbol areas is evaluated using a first paytable to determine credits won/lost; and the credit meter is updated accordingly.

At any time during game play, a second game mode may be triggered (step 406). In embodiments, the computational device 100 may be linked with other computational devices 100, and when the second game mode is triggered on any of the computational devices 100, the second game mode is triggered on all linked computational devices 100. If the second game mode is not triggered (No), then game play continues in the first game mode (step 402). If the second game mode is triggered (Yes), the method 400A may continue by the game instruction set 220 initiating a second game mode (step 408). For example, the game instruction set 220 calls the second game mode instruction set 228.

During the first or second game mode, one or more subsequent reel spins are initiated. In embodiments, free spins may be awarded during the first and second game modes. In embodiments, the second game mode may only be triggered when at least one computational device 100 of the bank of linked computational devices 100 is being played. However, once the second game mode is triggered on the bank of linked computational devices 100, a player may play any of the linked computational devices 100 while the second game mode is activated. In embodiments, a player may not be able to detect that a given computational device 100 is in the second game mode until they start to play the game. During second game mode, a player of each played gaming machine 100 is given a fixed amount of time to play at a higher payback percentage (e.g., a different paytable, a different random number generator, etc.). For example, during game play, a higher random multiplier is applied to all credit or jackpot coin wins (even the grand jackpot) during the fixed amount of time. In another example, additional lines of game play/game symbols may be activated during second game mode. In yet another example, a stationary activator may appear during the fixed amount of time. Alternatively or additionally, different prizes or bonuses may be offered during the second game mode. Triggering of the second game mode is also random, in other words, there is not a set amount of time between triggering of the second game mode. During the second game mode, the appearance of the game may be altered. For example, different lights and/or sounds may be activated during the second game mode. During the second game mode, the player can also change their wager (e.g., bet up or down).

In step 410, the method 400A evaluates game output of each played computational device 100 to determine a respective payout amount and the respective credit meter is updated accordingly. For example, the position of symbols within the array of symbol areas is evaluated based on a second paytable to determine credits won/lost; and the credit meter is updated accordingly.

In step 412, the method 400A determines whether a timer has expired. If the timer has expired (Yes), game play continues in the first game mode (step 402). If the timer has not expired (No), game play continues in the second game mode (step 408). In embodiments, the second game mode may be activated for a fixed amount of time (e.g., two minutes) and at the end of the fixed amount of time (e.g., timer expired), the method 400A continues with game play as normal (step 402). During the fixed amount of time (e.g., timer not expired), the method 400A continues with game play in second game mode (step 408).

Figure 4B:
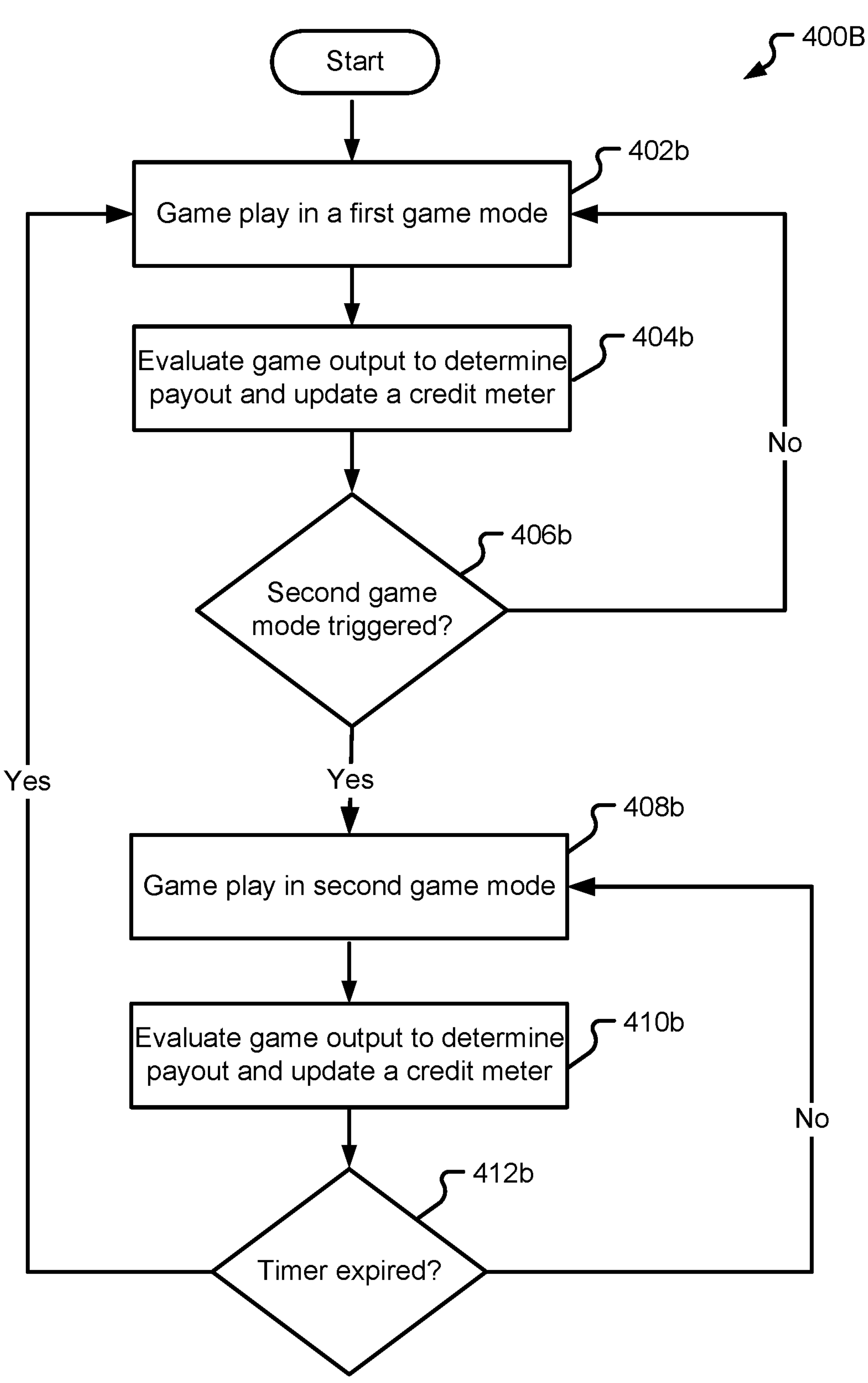

With reference to FIG. 4B, a method 400B of operating a computational device 100 with a possibility of a second game mode will be described in accordance with at least some embodiments of the present disclosure.

The method 400B begins when game play is initiated by a player of the computational device 100 (e.g., a wager is received). This step may occur in response to the player selecting a predetermined input device 108, e.g., a button, inserting coins, cash, tickets, vouchers, etc., or performing some other action at the computational device 100 that indicates a desire to begin game play.

The method 400B may continue by the game instruction set 220 initiating game play in a first game mode (step 402*b*). Game play may comprise a reel spin that leverages the random number generator 232 to determine a final position of symbols. In step 404*b*, game output is evaluated to determine a payout amount and a credit meter is updated accordingly. For example, the position of symbols within the array of symbol areas is evaluated using a first paytable to determine credits won/lost; and the credit meter is updated accordingly.

At any time during game play, a second game mode may be triggered (step 406*b*). In embodiments, the computational device 100 may be linked with other computational devices 100, and when the second game mode is triggered on any of the computational devices 100, the second game mode is triggered on all linked computational devices 100. If the second game mode is not triggered (No), then game play continues in the first game mode (step 402*b*). If the second game mode is triggered (Yes), the method 400B may continue by the game instruction set 220 initiating a second game mode (step 408*b*). For example, the game instruction set 220 calls the second game mode instruction set 228.

During the first or second game mode, one or more subsequent reel spins is initiated. In embodiments, free spins may be awarded during the first and second game modes. During second game mode (step 408*b*), a player is given a fixed amount of time to play at a higher payback percentage (e.g., a different paytable, a different random number generator, etc.). For example, during game play a higher random multiplier is applied to all credit or jackpot coin wins (even the grand jackpot) during the fixed amount of time. In another example, additional lines of game play/game symbols may be activated during second game mode. In yet another example, a stationary activator may appear during the fixed amount of time. Alternatively or additionally, different prizes or bonuses may be offered during the second game mode. Triggering of the second game mode is also random; in other words, there is not a set amount of time between triggering of the second game mode. During the second game mode, the appearance of the game may be altered. For example, different lights and/or sounds may be activated during the second game mode. During the second game mode, the player can also change their wager (e.g., bet up or down).

In step 410*b*, the method 400B evaluates game output to determine a payout amount and the credit meter is updated accordingly. For example, the position of symbols within the array of symbol areas is evaluated based on a second paytable to determine credits won/lost; and the credit meter is updated accordingly.

In step 412*b*, the method 400B determines whether a timer has expired. If the timer has expired (Yes), game play continues in the first game mode (step 402*b*). If the timer has not expired (No), game play continues in the second game mode (step 408*b*). In embodiments, the second game mode may be activated for a fixed amount of time (e.g., two minutes) and at the end of the fixed amount of time (e.g., timer expired), the method 400B continues with game play as normal (step 402*b*). During the fixed amount of time (e.g., timer not expired), the method 400B continues with game play in second game mode (step 408*b*).

Figures 5A, 5B:
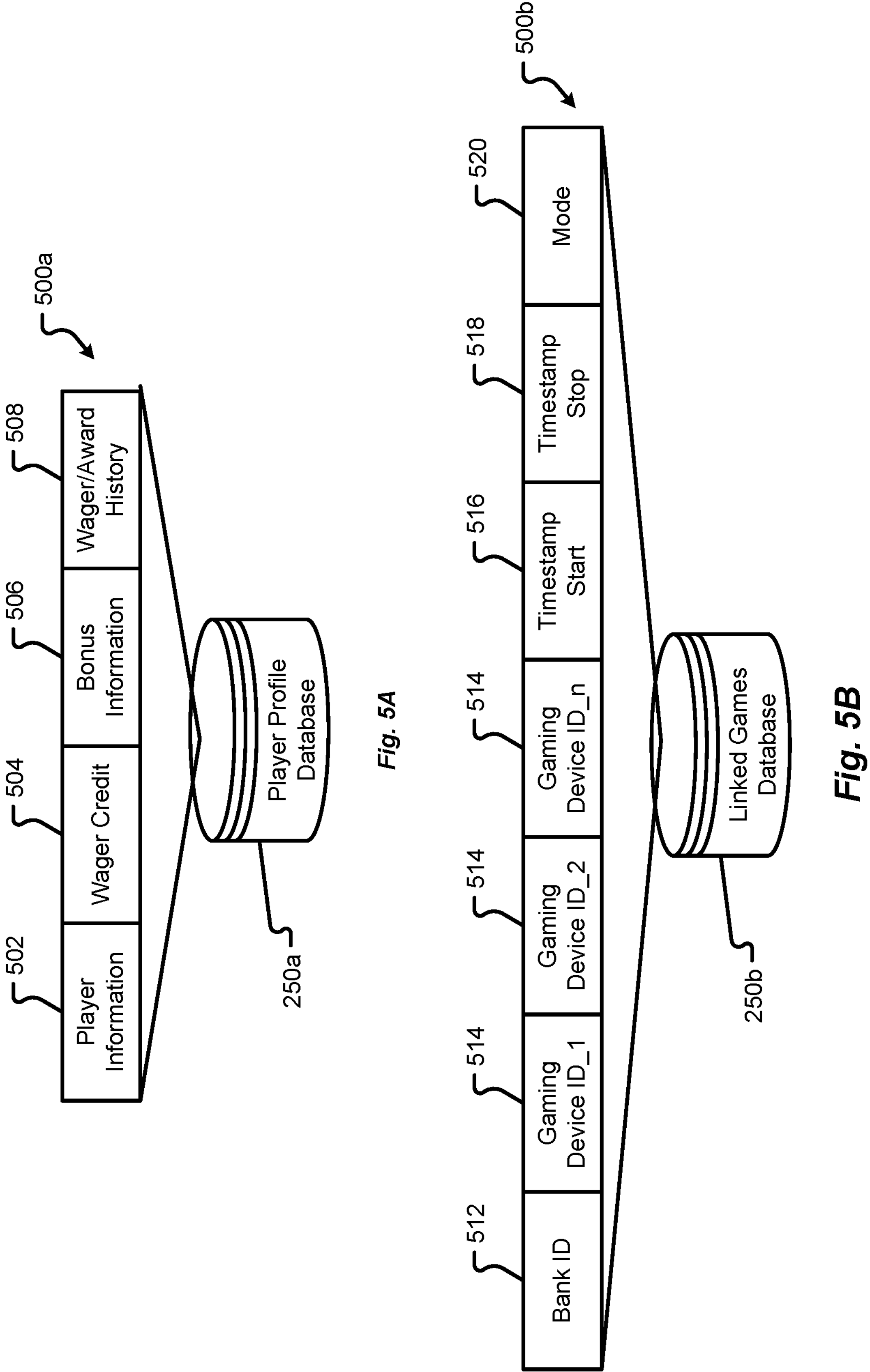
FIGS. 5A-B illustrate example data structures in accordance with embodiments of the present disclosure.

With reference to FIG. 5A, the data stored in the player profile database 250*a* may be stored for a plurality of different player profiles or for a single player profile. The player profile data structures 500*a* may include a player information field 502, wager credit field 504, bonus information field 506, and wager/award history field 508.

The player information field 502 may be used to store any type of information that identifies a player. In some embodiments, the player information field 502 may store one or more of username information for a player 280, contact information for the player (such as email address, phone number, social website webpage universal resource locator, and the like), password information for a player account, player status information, accommodations associated with the player 280, and any other type of customer service management data that may be stored with respect to a player 280.

The wager credit field 504 may be used to store data about a player's 280 available credit with a casino or a plurality of casinos. For instance, the wager credit field 504 may store an electronic record of available credit in the player's account and whether any restrictions are associated with such credit. The wager credit field 504 may further store information describing a player's available credit over time, wagers made over time, cash out events for the player, winning events for the player, and the like.

The bonus information field 506 may be used to store information describing awards that have been paid to the player 280 or that are available to be paid in response to particular events occurring within the gaming system. As a non-limiting example, the award information field 506 may be used to store electronic records for values of awards that are available to or have been paid to the player 280.

The wager/award history field 508 may store data related to awards, bonuses, mini bonuses, jackpots, side bets, etc. granted to the player 280. The wager/award history field 508 may also indicate when such awards were granted to the player 280, whether the awards have been redeemed, whether the awards are being funded by a game of chance or skill, a mini bonus associated with an event, or a side bet award.

With reference to FIG. 5B, the data stored in the linked game database 250*b* may be stored for a plurality of different records of linked games. In other words, each record in the linked game database 250*b* comprises information about a bank of linked gaming devices 100*a-n*. The linked game data structures 500*b* may include a Bank ID field 512 and two or more gaming device ID fields 514.

The Bank ID field 512 may be used to store any type of information that uniquely identifies each bank of linked gaming devices 100*a-n*. A gaming device may be standalone (e.g., not in a bank of linked gaming devices), and the Bank ID field 512 may be empty, a null value, 0, etc. The gaming device ID field 514 may be used to store any type of information that uniquely identifies each gaming devices 100*a-n* in a bank of linked games. A timestamp start field 516 may be used to store the time a mode (e.g., first or second mode) starts on a particular machine or particular bank of linked machines. A timestamp stop field 518 may be used to store the time a mode (e.g., first or second mode) ends on a particular machine or particular bank of linked machines. For example, a record may be created each time a gaming machine or a bank of linked gaming machines changes between the first and second mode. A mode field 520 may indicate the mode of gameplay (e.g., the first or second mode) on a particular gaming device or a particular bank of linked gaming devices. A number of variations and modifications of the disclosure can be used. It would be possible to provide for some features of the disclosure without providing others.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices. Moreover, an EGM as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk, such as a sports betting kiosk.

In various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the communication network includes a WAN, the gaming system includes a central server, central controller, or remote host and an EGM (or personal gaming device) each located in a different gaming establishment in a same geographic area, such as a same city or a same state. Gaming systems in which the communication network includes a WAN are substantially identical to gaming systems in which the communication network includes a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server."

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The invention is claimed as follows:

1. A method of operating a computational device, the method comprising:

initiating, with a first processor in a first game mode in a first gaming machine, a first reel spin in which a first random number generator output is used to determine a first position of symbols within an array of symbol areas;

after the first reel spin, evaluating, with the first processor, the first position of symbols within the array of symbol areas to determine whether the first reel spin results in a predetermined outcome warranting an update to a first credit meter;

updating the first credit meter based on the first reel spin results;

after the first reel spin, further evaluating, with the first processor, whether the first random number generator output triggered occurrence of a second game mode that is different from the first game mode;

determining, with the first processor, that the first random number generator output triggered occurrence of the second game mode;

in response to the determining that the random number generator output triggered occurrence of the second game mode, automatically initiating, by a second processor of a second gaming machine, the second game mode on the second gaming machine;

initiating, by the second processor in the second game mode, a reel spin in which a second random number generator output of a different second random number generator is used to determine a position of symbols within an array of symbol areas;

after the reel spin by the second processor, evaluating, by the second processor, the position of symbols within the array of symbol areas to determine that the reel spin results in a predetermined outcome warranting an update to a second credit meter of the second gaming machine;

updating the second credit meter based on the reel spin results, wherein the update to the second credit meter is independent of updates to the first credit meter of the first gaming machine; and terminating the second game mode on the second gaming machine and returning the second first gaming machine to the first game mode.

2. The method of claim 1, further comprising:

in response to the determining that the first random number generator output triggered occurrence of the second game mode, initiating the second game mode on the first gaming machine, the first and second gaming machines being in the second gamed mode simultaneously.

3. The method of claim 2, wherein the first game mode is associated with a first paytable and the second game mode is associated with a second paytable, the second paytable providing a higher expected return to player than the first paytable, and further comprising:

initiating, with the first processor in the second game mode, a second reel spin in which the first random number generator output is used to determine a second position of symbols within the array of symbol areas;

after the second reel spin, evaluating, with the first processor, the second position of symbols within the array of symbol areas to determine that the second reel spin results in a predetermined outcome warranting an update to the first credit meter;

updating the first credit meter based on the second reel spin results;

determining, from a timer output, that a predetermined time interval has expired since the initiation of the second game mode; and in response to the determining that the predetermined time interval has expired, terminating the second game mode and returning the first and second gaming machines to the first game mode.

4. The method of claim 3, wherein the second paytable applies only to wagers made during the second game mode and further comprising:

initiating, with the first processor in the second game mode, a third reel spin in which the first random number generator output is used to determine a third position of symbols within the array of symbol areas;

after the third reel spin, evaluating, with the first processor, the third position of symbols within the array of symbol areas to determine, from the second paytable, that the second reel spin results in a predetermined outcome warranting an update to the first credit meter;

determining, by the first processor, from the third position of symbols within the array of symbol areas that the player has earned a free reel spin; and maintaining, by the first processor, the second game mode during the free reel spin.

5. The method of claim 1, wherein the first and second gaming machines comprise first and second electronic gaming machines (EGM), respectively, the first EGM is being played by a first player, and the first EGM is associated with a second EGM played by a second player, and further comprising:

receiving, by a network interface of the second EGM, an electronic message from the first EGM to initiate the second game mode at a predetermined start time; and initiating, by the second EGM, the second game mode at the predetermined start time.

6. The method of claim 5, wherein the first random number generator output is generated by a random number generator or pseudorandom generator, and further comprising:

receiving, by the network interface of the second EGM, an electronic message from the first EGM to terminate the second game mode at a predetermined stop time; and in response to the receiving of the electronic message from the first EGM to terminate the second game mode, terminating the second game mode at the predetermined stop time and returning the second EGM to the first game mode.

7. The method of claim 1, wherein the evaluating after the first reel spin the position of symbols within the array of symbol areas to determine whether the first reel spin results in a predetermined outcome warranting an update to a credit meter comprises:

determining whether a first symbol is in a first position in the array of symbol areas, the first position being associated with a first reel, wherein, when the first symbol is in the first position, predetermined symbol types at a first set of positions in the array of symbol areas result in a second predetermined outcome warranting a first set of updates to the credit meter; and determining whether a second symbol is in a second position in the array of symbol areas, the second position being associated with a second reel, wherein, when the second symbol is in the second position, predetermined symbol types at a second set of positions in the array of symbol areas result in a third predetermined outcome warranting a second set of updates to the first credit meter, the first and second sets of updates being different.

8. The method of claim 1, wherein the second game mode comprises more lines of game play than the first game mode and wherein the second game mode comprises adding a random multiplier to all jackpots.

9. A computational device, comprising:

a user interface comprising a user input and a user output;

a first processor coupled with the user interface; and a computer memory device, coupled with the first processor, comprising instructions that are executable by the first processor, wherein the instructions, when executed by the first processor, cause the first processor to:

initiate, in a first game mode, a first reel spin in which a first random number generator output is used to determine a first position of symbols within an array of symbol areas;

after the first reel spin, evaluate the first position of symbols within the array of symbol areas to determine whether the first reel spin results in a predetermined outcome warranting an update to a first credit meter;

update the first credit meter based on the first reel spin results;

after the first reel spin, further evaluate whether the first random number generator output triggered occurrence of a second game mode different from the first game mode;

determine that the first random number generator output triggered occurrence of the second game mode;

in response to the determining that the random number generator output triggered occurrence of the second game mode, automatically initiate, by the first processor at a predetermined start time, the second game mode on the computational device; and cause a message to be sent to a second processor of a second computational device to automatically initiate, by the second processor at the predetermined start time, the second game mode on the second computational device.

10. The computational device of claim 9, wherein the first processor:

sends an electronic message to the second processor to terminate the second game mode at a predetermined stop time; and wherein causing the message to be sent to the second processor of the second computational device comprises one of: the first processor sending the message to the second processor, and the first processor sending a different message to a gaming server that causes the gaming server to send the message to the second processor.

11. The computational device of claim 9, wherein the first processor:

in response to the determining that the first random number generator output triggered occurrence of the second game mode, initiates the second game mode, the first game mode being based on a first expected return to player and the second game mode being based on a second expected return to player, the second expected return to player being higher than the first expected return to player;

initiates, in the second game mode, a second reel spin in which the first random number generator output is used to determine a second position of symbols within the array of symbol areas;

after the second reel spin, evaluates the second position of symbols within the array of symbol areas to determine that the second reel spin results in a predetermined outcome warranting an update to the first credit meter;

updates the first credit meter based on the second reel spin results and second expected return to player;

determines, from a timer output, that a predetermined time interval has expired since the initiation of the second game mode; and in response to the determining that the predetermined time interval has expired, terminates the second game mode and return to the first game mode.

12. A system, comprising:

a first processor;

a timer;

a credit meter;

a user interface comprising a user input and user output;

a network interface;

a random number generator; and a computer memory device, coupled with the first processor, comprising instructions; and wherein the first processor is coupled with the timer, credit meter, computer memory device, user interface, network interface, and random number generator, and wherein the instructions, when executed by the first processor, cause the first processor to:

initiate, in a first game mode in a first gaming machine, a first reel spin in which a first random number generator output is used to determine a first position of symbols within an array of symbol areas;

after the first reel spin, evaluate the first position of symbols within the array of symbol areas to determine whether the first reel spin results in a predetermined outcome warranting an update to a first credit meter;

update the first credit meter based on the first reel spin results;

after the first reel spin, further evaluate whether the first random number generator output triggered occurrence of a second game mode different from the first game mode;

determine that the first random number generator output triggered occurrence of the second game mode;

in response to the determining that the random number generator output triggered occurrence of the second game mode, cause a second processor of a second gaming machine to automatically terminate the first game mode and initiate the second game mode on the second gaming machine, wherein the first game mode is associated with a first expected return to player and the second game mode is associated with a second expected return to player, the second expected return to player being greater than the first expected return to player.

13. The system of claim 12, wherein the first processor is associated with a first electronic gaming machine (EGM) and the second processor with a second EGM, and wherein the second processor in the second game mode:

initiates a reel spin in which a second random number generator output of a different second random number generator is used to determine a position of symbols within an array of symbol areas;

after the reel spin by the second processor, evaluates the position of symbols within the array of symbol areas to determine that the reel spin results in a predetermined outcome warranting an update to a second credit meter of the second EGM;

updates the second credit meter based on the reel spin results, wherein the update to the second credit meter is independent of updates to the credit meter of the first EGM; and terminates the second game mode and returns the second EGM to the first game mode.

14. The system of claim 13, further comprising:

in response to the determining that the first random number generator output triggered occurrence of the second game mode, initiating, by the first processor, the second game mode, on the first EGM, the first and second EGMs being in the second gamed mode simultaneously.

15. The system of claim 13, wherein the first game mode is associated with a first paytable and the second game mode is associated with a second paytable, the second paytable providing a higher expected return to player than the first paytable and wherein the first processor:

initiates, in the second game mode, a second reel spin in which the first random number generator output is used to determine a second position of symbols within the array of symbol areas;

after the second reel spin, evaluates the second position of symbols within the array of symbol areas to determine that the second reel spin results in a predetermined outcome warranting an update to the first credit meter;

updates the first credit meter based on the second reel spin results;

determines, from a timer output, that a predetermined time interval has expired since the initiation of the second game mode; and in response to the determining that the predetermined time interval has expired, terminates the second game mode and returns the first and second gaming machines to the first game mode.

16. The system of claim 15, wherein the second paytable applies only to wagers made during the second game mode and wherein the first processor:

initiates, in the second game mode, a third reel spin in which the first random number generator output is used to determine a third position of symbols within the array of symbol areas;

after the third reel spin, evaluates the third position of symbols within the array of symbol areas to determine, from the second paytable, that the second reel spin results in a predetermined outcome warranting an update to the first credit meter;

determines from the third position of symbols within the array of symbol areas that the player has earned a free reel spin; and maintains the second game mode during the free reel spin.

17. The system of claim 12, wherein the first and second gaming machines comprise first and second electronic gaming machines (EGM), respectively, the first EGM is being played by a first player, and the first EGM is associated with a second EGM played by a second player and wherein the second EGM:

receives, by a network interface of the second EGM, an electronic message from the first EGM to initiate the second game mode at a predetermined start time; and initiates the second game mode at the predetermined start time.

18. The system of claim 17, wherein the first random number generator output is generated by a random number generator or pseudorandom generator and wherein the second EGM:

receives, by the network interface of the second EGM, an electronic message from the first EGM to terminate the second game mode at a predetermined stop time; and in response to the receiving of the electronic message from the first EGM to terminate the second game mode, terminates the second game mode at the predetermined stop time and returns the second EGM to the first game mode.

19. The system of claim 12, wherein, in the evaluating after the first reel spin the position of symbols within the array of symbol areas to determine whether the first reel spin results in a predetermined outcome warranting an update to the first credit meter, the first processor:

determines whether a first symbol is in a first position in the array of symbol areas, the first position being associated with a first reel, wherein, when the first symbol is in the first position, predetermined symbol types at a first set of positions in the array of symbol areas result in a second predetermined outcome warranting a first set of updates to the credit meter; and determines whether a second symbol is in a second position in the array of symbol areas, the second position being associated with a second reel, wherein, when the second symbol is in the second position, predetermined symbol types at a second set of positions in the array of symbol areas result in a third predetermined outcome warranting a second set of updates to the first credit meter, the first and second sets of updates being different.

20. The system of claim 12, wherein the second game mode comprises more lines of game play than the first game mode and wherein the second game mode comprises adding a random multiplier to all jackpots.

* * * * *